(12) United States Patent
Sung

(10) Patent No.: US 11,182,059 B2
(45) Date of Patent: Nov. 23, 2021

(54) USER INTERFACE SYSTEM FOR VEHICLE AND METHOD THEREFOR

(71) Applicants: HYUNDAI MOTOR COMPANY, Seoul (KR); KIA MOTORS CORPORATION, Seoul (KR)

(72) Inventor: Tae Hyun Sung, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 95 days.

(21) Appl. No.: 16/576,276

(22) Filed: Sep. 19, 2019

(65) Prior Publication Data

US 2020/0393942 A1    Dec. 17, 2020

(30) Foreign Application Priority Data

Jun. 17, 2019 (KR) .................. 10-2019-0071697

(51) Int. Cl.
| | | |
|---|---|---|
| *G06F 3/0481* | (2013.01) | |
| *G06F 3/0484* | (2013.01) | |
| *G06F 9/451* | (2018.01) | |
| *G06K 9/00* | (2006.01) | |
| *G06T 7/20* | (2017.01) | |
| *B60K 37/06* | (2006.01) | |

(52) U.S. Cl.
CPC .......... *G06F 3/0484* (2013.01); *G06F 3/0481* (2013.01); *G06F 9/451* (2018.02); *G06K 9/00288* (2013.01); *G06T 7/20* (2013.01); *B60K 37/06* (2013.01); *B60K 2370/741* (2019.05)

(58) Field of Classification Search
CPC ...... G06F 3/0484; G06F 9/451; G06F 3/0481; G06F 9/4451; G06F 21/6245; G06F 3/013; G06F 3/1423; G06K 9/00288; G06K 9/00838; G06T 7/20; B60K 37/06; B60K 2370/741; B60K 2370/11; B60K 2370/197; B60K 2370/736; B60K 2370/152; B60K 2370/157; B60K 2370/161; B60K 35/00
See application file for complete search history.

(56) References Cited

U.S. PATENT DOCUMENTS

| | | | | |
|---|---|---|---|---|
| 5,655,066 A | * | 8/1997 | Martin .................... | G06F 3/038 715/856 |
| 7,191,338 B2 | * | 3/2007 | Stern ....................... | G06F 21/84 713/183 |
| 8,462,949 B2 | * | 6/2013 | Anderson ............... | G06F 21/84 380/252 |
| 8,922,480 B1 | * | 12/2014 | Freed ..................... | G06F 3/0304 345/156 |
| 9,495,520 B2 | * | 11/2016 | Major ..................... | G06F 21/00 |
| 2013/0010103 A1 | * | 1/2013 | Ihara .................. | G06Q 30/0639 348/116 |
| 2016/0179454 A1 | * | 6/2016 | Liu ........................ | G06F 3/0488 715/747 |
| 2016/0342836 A1 | * | 11/2016 | Hanna ................ | H04N 5/23241 |

* cited by examiner

*Primary Examiner* — Yongjia Pan
(74) *Attorney, Agent, or Firm* — Morgan, Lewis & Bockius LLP

(57) ABSTRACT

A user interface system includes: an input device that receives an input of a user in a vehicle; a display that displays information in the vehicle; and a processor that determines whether to support a personal indication and a personal input for the user when receiving a request to enter personal information of the user, and supports to enter the personal information using the input device and the display as a result of the determination.

26 Claims, 6 Drawing Sheets

USER INTERFACE SYSTEM FOR VEHICLE AND METHOD THEREFOR

CROSS-REFERENCE TO RELATED APPLICATION

This application is claims the benefit of priority to Korean Patent Application No. 10-2019-0071697, filed in the Korean Intellectual Property Office on Jun. 17, 2019, the entire contents of which are incorporated herein by reference.

TECHNICAL FIELD

The present disclosure relates to a user interface system for vehicle and a method thereof.

BACKGROUND

With the development of information communication technology, the information communication technology may be applied to vehicles to provide a payment function in the vehicle. Such a payment function in the vehicle needs a process of entering information in which security is required, for example a personal identification number (PIN) for payment.

However, because an existing payment function in the vehicle uses an input and display device (a user interface) exposed to all of passengers, for example, audio video navigation (AVN), there is a risk that security information may be exposed to the passenger because a payment screen and an input process are exposed to the passenger in the vehicle.

A recognition device for recognizing fingerprints, irises, and/or the like is applied to the vehicle to prevent exposure of personal information, thus reducing a risk that the personal information may be exposed. However, separately adding the recognition device is economically infeasible.

SUMMARY

The present disclosure has been made to solve the above-mentioned problems occurring in the prior art while advantages achieved by the prior art are maintained intact.

An aspect of the present disclosure provides a user interface system for vehicle for minimizing exposure of personal information to a passenger when the personal information is entered and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a user interface system may include: an input device that receives an input of a user in a vehicle; a display device that displays information in the vehicle; and a processor that determines whether to support a personal display and a personal input for the user when receiving a request to enter personal information of the user, and supports to enter the personal information using the input device and the display device as a result of the determination.

The input device may include a public input device which is available to the user and other users in the vehicle and a personal input device which is available to only the user. The display device may include a public display device at which it is possible for the user and the other users to look.

The input device may include a public input device which is available to the user and other users. The display device may include a public display device at which it is possible for the user and the other users to look.

The processor may determine whether it is possible to support the personal display using the public display device, may receive the personal information via the input device and may display the received personal information on the public display device when it is possible to support the personal display, and may warn of a risk that the personal information will be exposed when it is impossible to support the personal display.

The system may further include a line-of-sight tracking device that performs line-of-sight tracking of the other users. The processor may determine whether the other users look at the public display device through the line-of-sight tracking, may receive the personal information via the input device and may display the received personal information on the public display device when the other users do not look at the public display device, and may warn of a risk that the personal information will be exposed when the other users look at the public display device.

The system may further include a passenger recognition device that detects other users in the vehicle. The processor may receive the personal information via the input device and may display the received personal information on the public display device when the other users in the vehicle are not detected by the passenger recognition device and may warn of a risk that the personal information will be exposed when the other users are detected.

The processor may fail to display the personal information input via the public input device on the public display device based on predetermined configuration information.

The input device may include a public input device which is available to the user and other users. The display device may include a public display device at which it is possible for the user and the passenger to look and a public display device at which it is possible for only the user to look.

The processor may configure an input screen by mapping a display device region of the private display device and an input region of the public input device and may display the input screen on the private display device.

The processor may fail to display the input screen on the public display device or may display an input screen different from the input screen on the public display device.

The processor may display an input current situation via the public input device on the private display device when the private display device supports an augmented reality (AR) function and may generate the personal information using information of the private display device, the information being mapped to an input of the public input device.

The processor may generate the personal information using information of the private display device, the information being mapped to an input of the public input device, when the private display device does not support an AR function.

The input device may include a plurality of personal input device, each of which is located for each seat in the vehicle. The processor may select any one of the plurality of input devices and may support to enter the personal information.

The processor may recognize the user by a face recognition device and may support to enter the personal information via the personal input device matched to a location of the user.

According to another aspect of the present disclosure, a user interface method may include: determining whether to support a personal display for a user, when receiving a request to enter personal information of the user in a vehicle, determining whether to support a personal input for the user, and supporting to enter the personal information using an input device and a display device depending on whether to support the personal display and whether to support the personal input.

The determining whether to support the personal display for the user may include determining whether there is a private display device at which it is possible for only the user to look, other than a public display device at which it is possible for the user and other users to look, in the vehicle.

The determining whether to support the personal input for the user may include determining whether there is a personal input device which is available to only the user, other than a public input device which is available to the user and the other users, in the vehicle.

The determining whether to support the personal input for the user may further include determining whether it is possible to support a personal display using the public display device at which it is possible for the user and the other users to look, when the personal display for the user is not supported.

The determining whether it is possible to support the personal display using the public display device may include receiving the personal information via the input device and displaying the received personal information on the public display device, when it is possible to support the personal display using the public display device.

The method may further include determining whether it is possible to perform line-of-sight tracking of the other users in the vehicle, when it is impossible to support the personal display using the public display device and determining whether the other users look at the public display device through the line-of-sight tracking, when it is possible to perform the line-of-sight tracking of the other users.

The method may further include outputting a warning about a risk that the personal information will be exposed, when the other users look at the public display device.

The method may further include receiving the personal information via the input device and displaying the received personal information on the public display device, when the other users do not look at the public display device.

The method may further include determining whether it is possible to recognize the other users in the vehicle, when it is impossible to perform the line-of-sight tracking of the other users and outputting a warning about a risk that the personal information will be exposed, when it is impossible to recognize the other users.

The determining whether it is possible to recognize the other users may include detecting the other users in the vehicle through the passenger recognition, when it is possible to recognize the other users, outputting a warning about a risk that the personal information will be exposed, when the other users are detected, and receiving the personal information via the input device and displaying the received personal information on the public display device, when the other users are not detected.

The determining whether to support the personal display for the user may include configuring an input screen by mapping a display device region of the private display device and an input region of the public input device, displaying the input screen on the private display device, determining, by the private display device, whether an AR function is being used, displaying an input current situation via the public input device on the private display device, when the AR function is used, generating the personal information using information of the private display device, the information being mapped to an input of the public input device, and receiving the generated personal information and displaying the received personal information on the private display device.

The method may further include, after determining whether to use the AR function, generating the personal information using information of the private display device, the information being mapped to an input of the public input device, when the AR function is not used.

The method may further include, after determining whether to support the personal input, determining whether to support a line-of-sight tracking function, when there is no the private display device, determining whether the other users look at the public display device, when the line-of-sight tracking function is supported, and outputting a warning about a risk that the personal information will be exposed, when the other users look at the public display device.

The method may further include receiving the personal information via the public input device and displaying the received personal information on the public display device, when the other users do not look at the public display device.

The method may further include, after determining whether to support the line-of-sight tracking function, determining whether to support a passenger recognition function, when the line-of-sight tracking function is not supported, detecting the other users in the vehicle using the passenger recognition function, when the passenger recognition function is supported, and displaying personal information input via the public input device on the public display device, when the other users are not detected in the vehicle.

The method may further include outputting a warning about a risk that the personal information will be exposed, when the passenger recognition function is not supported or when the other users are detected in the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
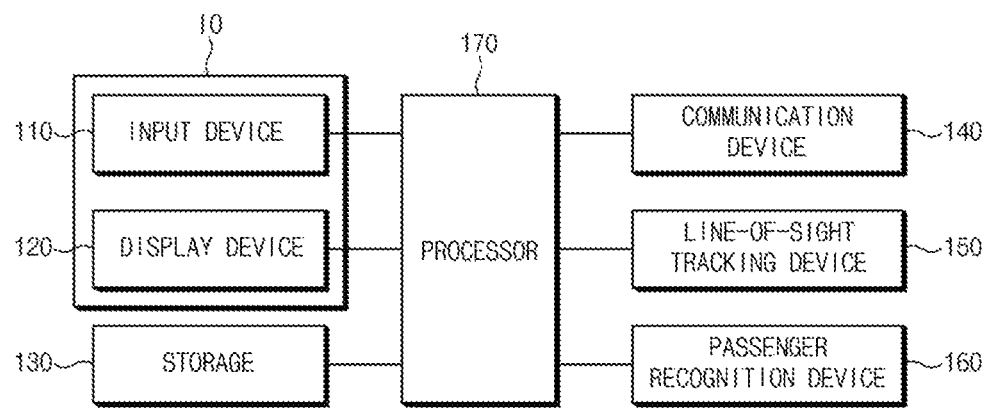
FIG. 1 is a block diagram illustrating a configuration of a user interface system for vehicle according to an exemplary embodiment of the present disclosure.

Hereinafter, exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a user interface system for vehicle according to an exemplary embodiment of the present disclosure. FIGS. 2A to 2D are block diagrams illustrating a configuration of a user interface shown in FIG. 1.

Referring to FIG. 1, the user interface system may be loaded into a vehicle and may include an input device 110, a display device 120, a storage 130, a communication device 140, a line-of-sight tracking device 150, a passenger recognition device 160, and a processor 170.

The input device 110 may receive an input of a passenger in the vehicle. In other words, the input device 110 may generate data according to manipulation of the passenger. Herein, the passenger may include a user who should enter personal information and other users who do not enter personal information. The input device 110 may be implemented as a steering wheel, a button, a switch, a touch pad, a touch screen, a manipulator, and/or the like.

The input device 110 may include a public input device 111 which is available to both of a user and other users. Furthermore, the input device 110 may further include a personal input device 112 which may be used (manipulated) by only the user. The personal input device 112 may be disposed on only the driver's seat or may be arranged on one or more of passenger seats. Alternatively, the personal input device 112 may be arranged all seats in the vehicle, that is, the driver's seat and respective passenger seats.

The display device 120 may display a variety of information in the vehicle. The display device 120 may be implemented as a liquid crystal display (LCD), a thin film transistor-LCD (TFT LCD), an organic light-emitting diode (OLED) display, a flexible display, a three-dimensional (3D) display, a transparent display, a head-up display (HUD), a touch screen, a wearable display, a cluster, and/or the like.

The display device 120 may include a speaker capable of audio data. For example, the display device 120 may output a message for providing a notification of a risk that personal information will be exposed on a display device screen and may output a warning sound via the speaker.

The display device 120 may include a public display device 121, which is exposed to all of the user and the other users, at which it possible for the user and the other users to look. The public display device 121 may be located within lines of sight of the user and the other users. Furthermore, the display device 120 may further include a private display device 122, which is exposed to only the user, at which it is possible for only the user to look. The private display device 122 may be located within a line of sight of the user and may be out of a line of sight of the other users.

The input device 110 and the display device 120 may be implemented in the form of being combined into one. The input device 110 and the display device 120 may be commonly called a user interface IO. The user interface IO may be implemented as the following four configurations.

Figure 2A:
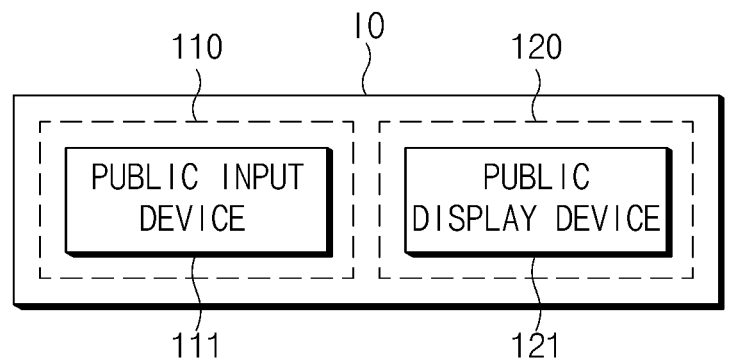
FIGS. 2A, 2B, 2C, and 2D are block diagrams illustrating a configuration of a user interface shown in FIG. 1.

First, as shown in FIG. 2A, the user interface IO may be configured with the input device 110 including the public input device 111 and the display device 120 including the public display device 121. In this case, a vehicle may support a public input and a public indication.

Figure 2B:
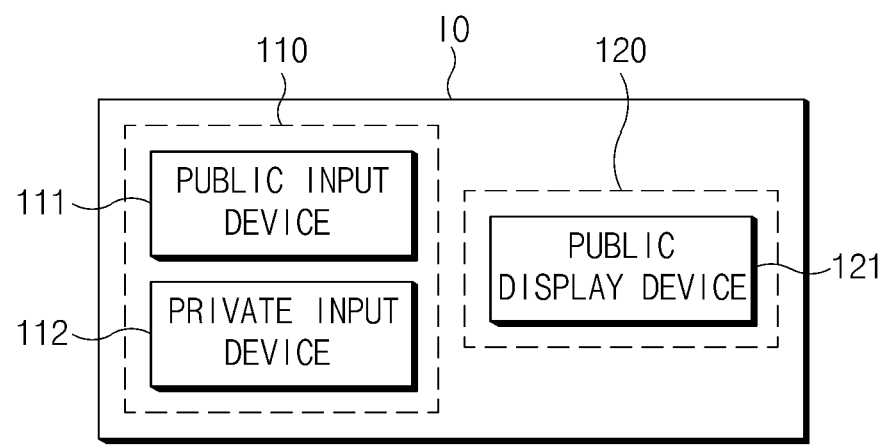

Secondly, as shown in FIG. 2B, the user interface IO may be configured with the input device 110 including the public input device 111 and a personal input device 112 and the display device 120 including the public display device 121. In this case, the vehicle may support a public input, a personal input, and a public indication.

Figure 2C:
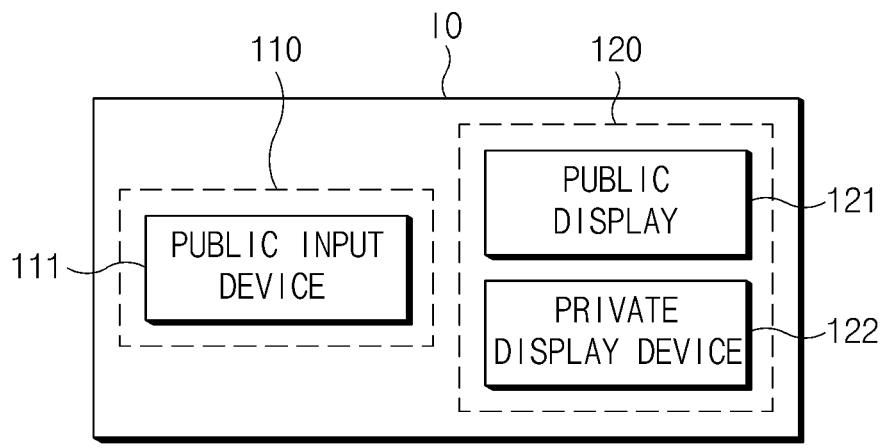

Thirdly, as shown in FIG. 2C, the user interface IO may be configured with the input device 110 including the public input device 111 and the display device 120 including the public display device 121 and a private display device 122. In this case, the vehicle may support a public input, a public indication, and a personal display.

Figure 2D:
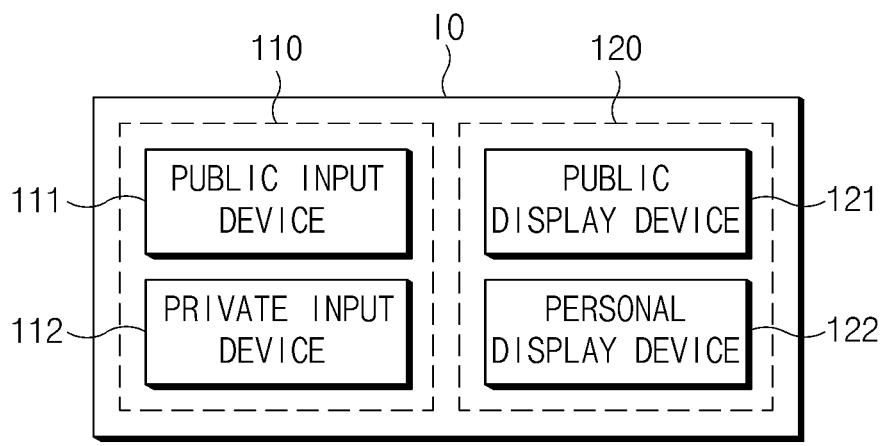

Finally, as shown in FIG. 2D, the user interface IO may be configured with the input device 110 including the public input device 111 and the personal input device 112 and the display device 120 including the public display device 121 and the private display device 122. In this case, the vehicle may support a public input, a personal input, a public indication, and a personal display.

The storage 130 may store software programmed for the processor 170 to perform a predetermined operation. The storage 130 may store data (information) input from the input device 110. The storage 130 may store a mapping algorithm or the like.

The storage 130 may be implemented with at least one or more of storage media (recording media), for example, a flash memory, a hard disk, a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), a register, a removable disk, and a web storage.

The communication device 140 may communicate with an external electronic device (not shown). The communication device 140 may use the wireless Internet technology, such as wireless local area network (WLAN) (wireless-fidelity (Wi-Fi)) and/or wireless broadband (Wibro), the short-range communication technology, such as Bluetooth and/or near field communication (NFC), the mobile communication technology, such as long term evolution (LTE), LTE-Advanced, and/or international mobile telecommunication-2020 (IMT-2020), and/or the wired Internet technology, such as local area network (LAN) and/or Ethernet.

The communication device 140 may receive a message for requesting personal information from the outside. When receiving the personal information request message, the communication device 140 may deliver the personal information request message to the processor 170.

The line-of-sight tracking device 150 may track a line of sight of a passenger using a camera (not shown) mounted on the vehicle. The line-of-sight tracking device 150 may estimate a point the passenger looks at, using a previously stored line-of-sight tracking algorithm. The line-of-sight tracking device 150 may track a line of sight of the passenger using at least one or more of various well-known line-of-sight tracking technologies.

The passenger recognition device 160 may determine whether there is a passenger for each seat in the vehicle. The passenger recognition device 160 may recognize (identify) the passenger using the camera, a face recognition technology, and the like. Furthermore, the passenger recognition device 160 may determine whether there is a passenger for each seat using a pressure sensor mounted on each seat.

The processor 170 may receive a request to enter personal information of a user. Herein, the personal information may be information in which security is required, for example, a personal identification number (PIN), a signature, and/or the like.

In the present disclosure, the processor 170 may be configured as a central processing unit (CPU) controlling overall operations of each unit and surrounding equipment (device or system). Each unit and surrounding equipment may be configured as a form of hardware, a software, or a combination form of hardware and software. Their function and operation may be substantially controlled or interlocked by the processor 170.

When receiving the request to enter the personal information, the processor 170 may determine whether it is possible to support a personal display for the user. The processor 170 may determine whether there is the private display device 122 in the vehicle. When there is the private display device 122 in the vehicle, the processor 170 may determine whether the private display device 122 is located within a line of sight of the user. When the private display device 122 is located within the line of sight of the user, the processor 170 may determine that it is possible to support the personal display. When there is no the private display device 122 in the vehicle or when the private display device 122 is unavailable to the user because the private display device 122 is not located within the line of sight of the user although there is the private display device 122 in the vehicle, the processor 170 may determine that it is impossible to support the personal display.

The processor 170 may determine whether it is possible to support a personal input for the user. The processor 170 may determine whether there is the personal input device 112, which is available to the user for private use, in the vehicle. When there is the personal input device 112 in the vehicle and when it is possible for the user to manipulate the personal input device 112, the processor 170 may determine that it is possible to support the personal input. When there is no the personal input device 112 in the vehicle or when it is impossible for the user to manipulate the personal input device 112 although there is the personal input device 112 in the vehicle, the processor 170 may determine that it is impossible to support the personal input.

When using both the personal input device 112 and the private display device 122, that is, when supporting both the personal input and the personal display, the processor 170 may receive personal information of the user via the personal input device 112. In this case, the processor 170 may receive the personal information via the public input device 111. The processor 170 may display the received personal information on the private display device 122. When the personal information input is completed, the processor 170 may transmit the personal information, the input of which is completed, to a request place which requests the personal information.

For example, when attempting to perform payment using payment information of the driver in the vehicle, the processor 170 may request the driver to enter the payment information by an HUD exposed to only the driver, that is, the private display device 122. When the driver manipulates the personal input device 112 and enters the payment information, the processor 170 may display the input information on the private display device 122.

When the user does not use the personal input device 112 although there is the personal input device 112 and the private display device 122 in the vehicle, the processor 170 may output a warning for providing a notification that there is a risk that the personal information will be exposed (hereinafter referred to as "personal information exposure risk warning") when the personal information is entered.

When it is able for the private display device 112 to support an augmented reality (AR) function, the processor 170 may map an input region of the public input device 111 and a display device region of the private display device 122 to configure an input screen. The processor 170 may output the input screen on the private display device 122. When the private display device 122 supports the AR function and uses the AR function, the processor 170 may display an input current situation of the public input device 111 on the private display device 122. The processor 170 may map an input location output from the public input device 111 onto a display device screen of the private display device 122 to determine input data.

Although there is the private display device 122 at which it possible for only the user, who is an entity who enters personal information, to looks, when there is no the personal input device 112 matched to the private display device 122, the processor 170 may display a keypad having a key arrangement different from a key arrangement of the public input device 111 on the private display device 122. In this case, the processor 170 may detect (sense) a location of a pointer (e.g., a finger) using a proximity sensor mounted on the public input device 111 and may map and display the detected location of the point on an input screen of the private display device 122. The processor 170 may determine information of a point mapped on the input screen of the private display device 122 as input data.

Alternatively, when the user wears an AR display (a wearable display), that is, the private display device 122 and when the personal input device 112 is configured as a touch panel, the processor 170 may display a virtual keypad on an AR display screen and may determine key information of the virtual keypad mapped to a touch location input through the touch panel as input data to display the determined input data on the AR display.

When the private display device 122 does not support the AR function or when the private display device 122 does not use the AR function although the private display device 122 supports the AR function, the processor 170 may map an input location output from the public input device 111 onto a display device screen of the private display device 122 to determine input data. The processor 170 may receive the determined input data as personal information and may display the received personal information on the private display device 122.

When there is no the private display device 122 in the vehicle, the processor 170 may determine whether it is possible to use the public display device 121 for personal use. In other words, the processor 170 may determine whether the public display device 121 is located within a line of sight of the user. When the public display device 121 is located within the line of sight of the user, the processor 170 may determine whether there is the personal input device 112 in the vehicle. When there is the personal input device 112 as a result of the determination, the processor 170 may receive personal information via the personal input device 112 and may display the received personal information on the public display device 121.

When it is unable to use the public display device 121 for personal use, the processor 170 may determine whether there is the personal input device 112 in the vehicle. When there is the personal input device 112 in the vehicle, the processor 170 may determine whether it is able to display data input via the personal input device 112 on the public display device 121. When it is unable to display the data input via the personal input device 112 on the public display device 121, the processor 170 may receive personal information via the personal input device 112 and may fail to display the received personal information on the public display device 121.

When it is able to display the data input via the personal input device 112 on the public display device 121, the processor 170 may determine whether it is possible to perform line-of-sight tracking. When it is possible to perform the line-of-sight tracking, the processor 170 may determine other users look at the public display device 121 by the line-of-sight tracking device 150.

When the other users look at the public display device 121, the processor 170 may output a personal information exposure risk warning. When the other users do not look at the public display device 121, the processor 170 may receive personal information via the personal input device 112 and may output the received personal information on the public display device 121. In this case, the processor 170 may receive the personal information via the public input device 111.

When it is impossible to perform the line-of-sight tracking, the processor 170 may determine whether it is possible to determine whether there is other users. When there is the passenger recognition device 160 in the vehicle, the processor 170 may determine that it is possible to determine whether there is the other users. When recognizing the other users in the vehicle by the passenger recognition device 160, the processor 170 may warn of a risk that personal information will be exposed. When there is no the passenger recognition device 160 in the vehicle or when the other users are not recognized in the vehicle by the passenger recognition device 160, the processor 170 may receive personal information via the personal input device 112 and may display the received personal information on the public display device 121. In this case, the processor 170 may receive the personal information via the public input device 111.

When there is a request to enter personal information, the processor 170 may select any one of the personal input devices 112 arranged for each seat in the vehicle for private use for inputting personal information. When it is unable for the user to manipulate the selected personal input device 112, he or she may move to a seat where the personal input device 112 is located and may enter personal information by the personal input device 112.

Furthermore, the processor 170 may recognize the user who will enter personal information using a face recognition technology and may enable the personal input device 112 mapped to a location of the user for private use for inputting the personal information.

Figure 3A:
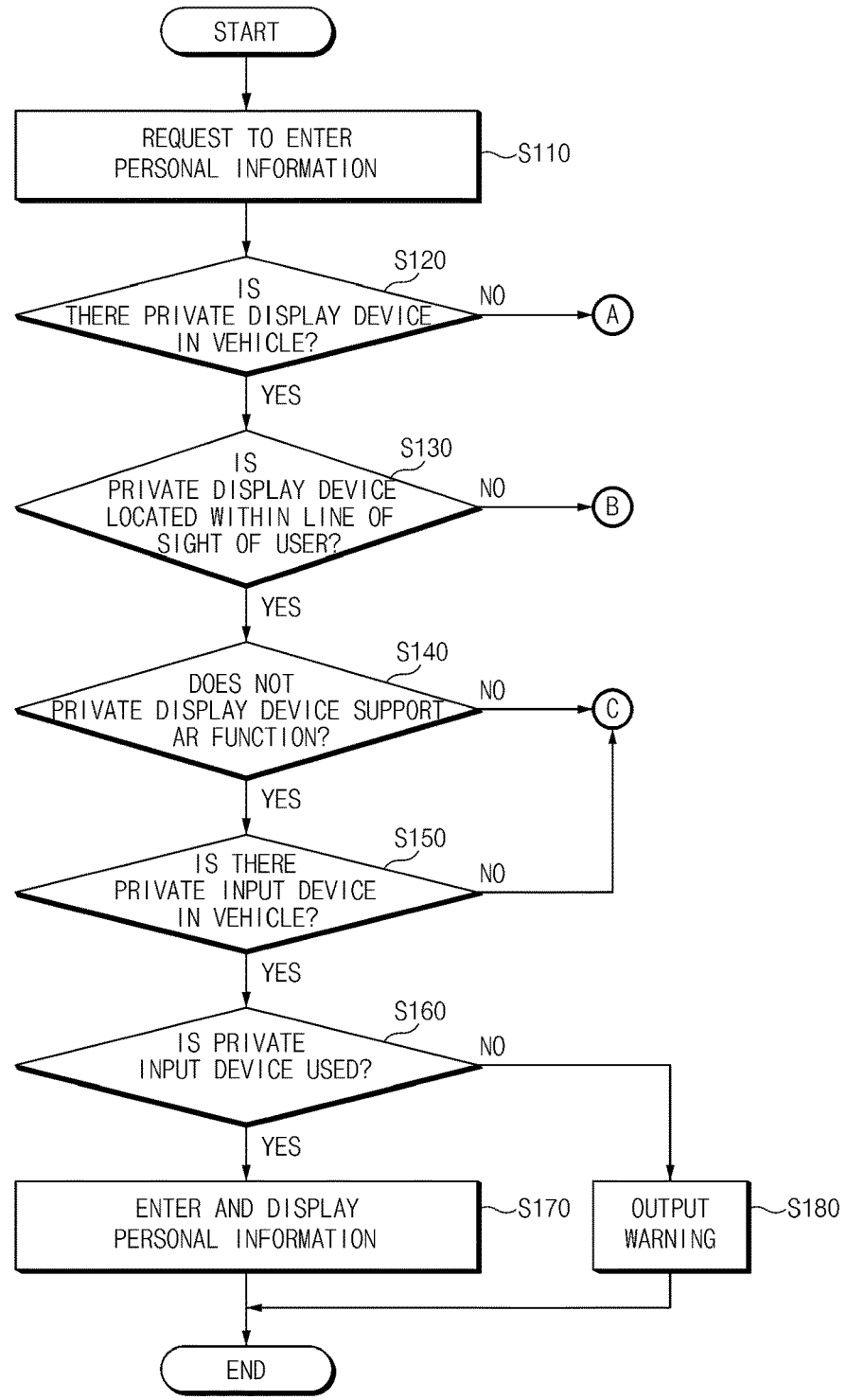
FIGS. 3A, 3B, and 3C are flowcharts illustrating a user interface method for vehicle according to an exemplary embodiment of the present disclosure.
Figure 3B:
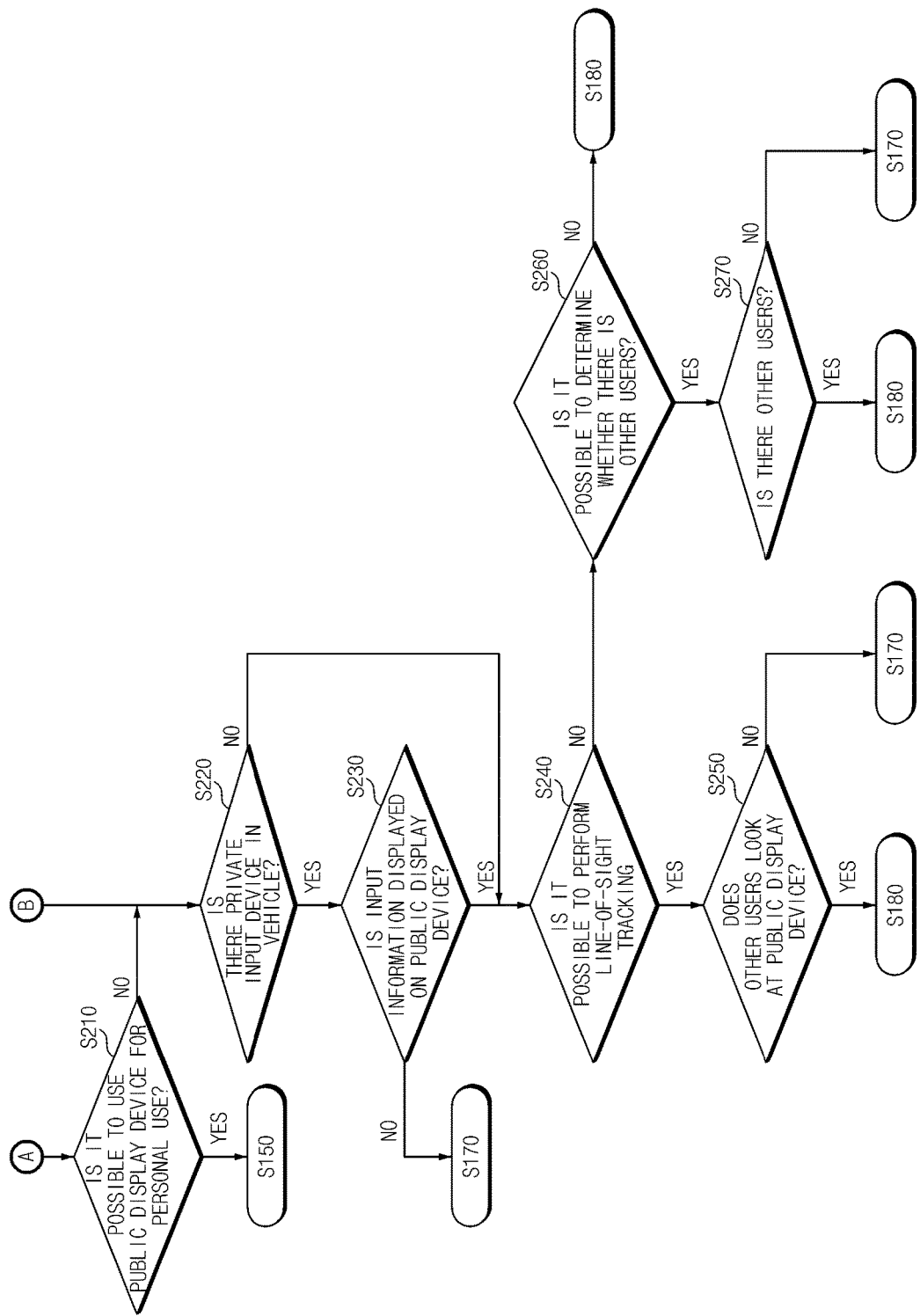
Figure 3C:
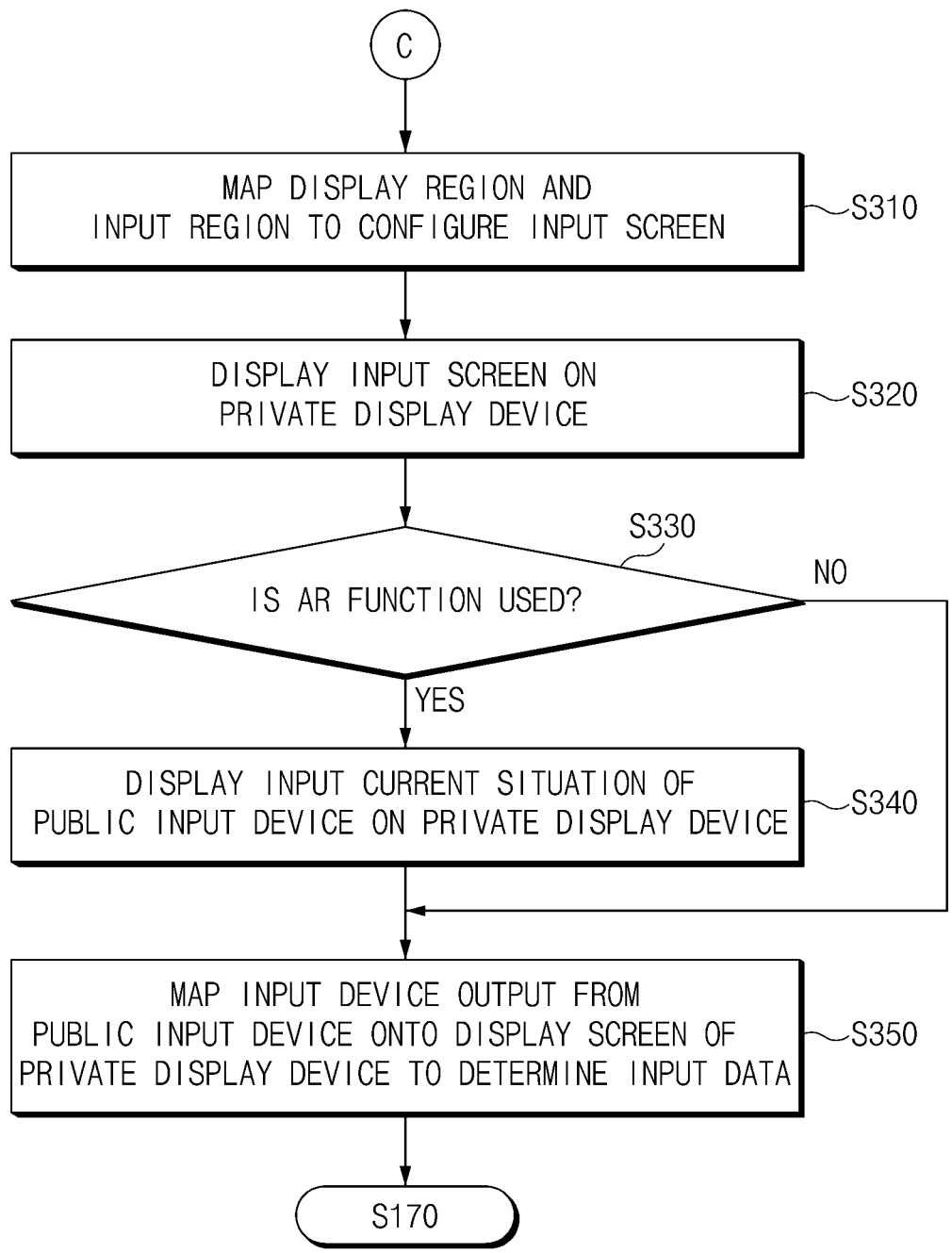

FIGS. 3A to 3C are flowcharts illustrating a user interface method for vehicle according to an embodiment of the present disclosure.

First, in S110, a processor 170 of FIG. 1 may receive a request to enter personal information of a user in a vehicle. For example, the processor 170 may receive the request to enter the personal information of the user from the outside via a communication device 140 of FIG. 1.

When there is the request to enter the personal information of the user, in S120, the processor 170 may determine whether there is a private display device 122 in the vehicle. In other words, the processor 170 may determine whether it is possible for the vehicle to support a personal display.

When there is the private display device 122 in the vehicle, in S130, the processor 170 may determine whether the private display device 122 is located within a line of sight of the user. In this case, the processor 170 may determine whether it is possible to support a personal display for the user.

When the private display device 122 is located within the line of sight of the user, in S140, the processor 170 may determine whether the private display device 122 does not support an augmented reality (AR) function. The processor 170 may determine whether the private display device 122 is a display device which supports the AR function.

When the private display device 122 does not support the AR function, in S150, the processor 170 may determine whether there is a personal input device 112 in the vehicle. In other words, the processor 170 may determine whether the vehicle supports a personal input.

When there is the personal input device 112 in the vehicle, in S160, the processor 170 may determine whether the personal input device 112 is used. The processor 170 may determine whether there is an input from the personal input device 112.

When the personal input device 112 is used, in S170, the processor 170 may receive the personal information of the user via the personal input device 112 and may display the received personal information on the private display device 122.

When the personal input device 112 is not used, in S180, the processor 170 may output a personal information exposure risk warning. When there is no input from the personal input device 112, but when there is an input from a public input device 111, the processor 170 may output a warning for providing a notification of a risk that the personal information will be exposed.

When there is no the private display device 122 in the vehicle in S120, in S210, the processor 170 may determine whether it is possible to use a public display device 121 for personal use. In other words, the processor 170 may determine whether it is possible to support a personal display using the public display device 121. When it is possible to use the public display device 121 for personal use, the processor 170 may perform the operation from S150. For example, when the public display device 121 is located within a line of sight of the user, the processor 170 may determine that it is possible to support the personal display.

Meanwhile, when it is impossible to use the public display device 121 for personal use, that is, when it is possible to use the public display device 121 for only public use, in S220, the processor 170 may determine whether there is the personal input device 112 in the vehicle. When the public display device 121 is located out of the line of sight of the user, the processor 170 may determine that it is impossible to support the personal display. For example, when the user who will enter payment information upon payment in the vehicle rides in the driver's seat, the processor 170 may determine that it is impossible to use the public display device 121 for personal use when it is determined that the public display device 121 is located on a rear seat in the vehicle.

When there is the personal input device 112 in the vehicle, in S230, the processor 170 may determine whether to display input information on the public display device 121. In this case, the processor 170 may inquire of the user whether to display data input via the personal input device 112 on the public display device 121 or may determine whether to display the data input via the personal input device 112 on the public display device 121 depending on predetermined configuration information.

When it is determined that the input information is displayed on the public display device 121, in S240, the processor 170 may determine whether it is possible to perform line-of-sight tracking. The processor 170 may determine whether a line-of-sight tracking device 150 of FIG. 1 is loaded into the vehicle.

When it is possible to perform the line-of-sight tracking, in S250, the processor 170 may determine whether other users look at the public display device 121 through the line-of-sight tracking. The processor 170 may detect a point the other users look at by the line-of-sight tracking device 150 and may determine whether the detected point is located on the public display device 121.

When the other users look at the public display device 121, in S180, the processor 170 may warn of a risk that the personal information will be exposed. The processor 170 may display a message for providing a notification of a risk that the personal information will be exposed on the public display device 121 or may output a warning sound. Alternatively, the processor 170 may output the warning sound at the same time as displaying the message for providing the notification of the risk that the personal information will be exposed.

When the other users do not look at the public display device 121, in S170, the processor 170 may receive personal information via the personal input device 112 and may display the received personal information on the public display device 121.

When it is impossible to perform the line-of-sight tracking in S240, in S260, the processor 170 may determine whether it is possible to determine whether there are other users. The processor 170 may determine whether a passenger recognition device 160 of FIG. 1 is loaded into the vehicle.

When it is possible to determine whether there is the passenger, in S270, the processor 170 may determine whether there are other users in the vehicle. The processor 170 may determine whether there are the other users by the passenger recognition device 160. Furthermore, the processor 170 may identify (recognize) the other users by the passenger recognition device 160.

When there are the other users, in S180, the processor 170 may output a warning for providing a notification of a risk that the personal information will be exposed. When there are no the other users, in S170, the processor 170 may display personal information input via the personal input device 112 on the public display device 121.

When it is impossible to determine whether there are the other users in S260, the processor 170 may output a warning for providing a notification of a risk that the personal information will be exposed.

When the private display device 122 is not located within the line of sight of the user in S130, the processor 170 may perform the operation from S220.

When the private display device 122 supports the AR function in S140 or when there is no the personal input device 112 in the vehicle in S150, in S310, the processor 170 may map an input region of the public input device 111 and a display device region of the private display device 122 to configure an input screen.

In S320, the processor 170 may display the configured input screen on the private display device 122.

In S330, the processor 170 may determine whether the AR function is used. The processor 170 may inquire of the user whether to use the AR function or may determine whether to use the AR function based on predetermined configuration information.

When the AR function is used, in S340, the processor 170 may display an input current situation of a public input device 111 on a private display device 122. In other words, the processor 170 may display a pointer trajectory according to manipulation of the public input device 111 on the private display device 122.

In S350, the processor 170 may map an input location output from the public input device 111 onto a display device screen of the private display device 122 to determine input data. In S170, the processor 170 may receive the determined input data as personal information and may display the received personal information on the private display device 122.

According to exemplary embodiments of the present disclosure, the user interface system may determine whether to support a personal display and a personal input when personal information is entered in the vehicle and may support to enter the personal information using an input device and a display device as a result of the determination, thus minimizing a risk that the personal information may be exposed to other users and allowing the other users other than a driver to efficiently enter the personal information.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A user interface system mounted on a vehicle, the system comprising:
    an input device configured to receive an input of one or more users in the vehicle, wherein the one or more users include a first user and one or more second users;
    a display device configured to display information in the vehicle; and
    a processor configured to:
        determine whether to support a personal display and a personal input for the first user seated in a first user's seat when receiving a request to enter personal information of the first user, and
        support to enter the personal information using the input device and the display device as a result of the determination,
    wherein each seat of the vehicle includes the input device and the display device,
    wherein the input device includes at least one of a first input device or a second input device, and the display device includes at least one of a first display device or a second display device,
    wherein the processor is further configured to determine whether the first display device supports an augmented reality (AR) function,
    wherein, when the input device includes the second input device and the display device includes the second display device and the first display device and when the first display device supports the AR function, the processor maps a display region of the first display device and an input region of the second input device, and determines information of a point, which is mapped to an input location outputted from the second input device, on the display region of the first display device as input data, and receives the determined input data as the personal information to the first display device, wherein the second input device and the second display device are located within lines of sight of the first user and the one or more second users in respective seats in the vehicle, and wherein the first display device is located within a line of sight of the first user and is out of a line of sight of the one or more second users.

2. The system of claim 1, wherein the second input device is configured to receive an input from at least one of the first user or the one or more second users, wherein the first input device is configured to receive an input only from the first user, and wherein the second display device is configured to display the information to the first user and the one or more second users.

3. The system of claim 2, wherein the processor:

determines whether supporting the personal display using the second display device is possible, when the supporting the personal display is possible, receives the personal information via the input device and displays the received personal information on the second display device and when the supporting the personal display is not possible, warns of a risk of the personal information being exposed.

4. The system of claim 2, further comprising a line-of-sight tracking device configured to perform line-of-sight tracking of the one or more second users, wherein the processor:

determines whether the one or more second users look at the second display device through the line-of-sight tracking, when the one or more second users do not look at the second display device, receives the personal information via the input device and displays the received personal information on the second display, and when the one or more second users look at the second display device, warns of a risk of the personal information being exposed.

5. The system of claim 2, further comprising a passenger recognition device configured to detect the one or more second users in the vehicle, wherein the processor:

when the one or more second users are not detected by the passenger recognition device, receives the personal information via the input device and displays the received personal information on the second display device, and when the one or more second users are detected, warns of a risk of the personal information.

6. The system of claim 1, wherein the second input device is configured to receive an input from at least one of the first user or the one or more second users, and wherein the second display device is configured to display the information to the first user and the one or more second users.

7. The system of claim 6, wherein the processor is configured not to display the personal information inputted via the second input device on the second display device according to predetermined configuration information.

8. The system of claim 1, wherein the second input device is used by the first user and the one or more second users.

9. The system of claim 1, wherein the processor does not display the input screen on the second display device or displays an input screen different from the input screen on the second display device.

10. The system of claim 1, wherein the processor displays a pointer trajectory according to manipulation of the second input device on the first display device when the personal display supports AR function, and generates the personal information using information of the first display device, the information of the pointer mapped to the input location outputted from the second input device.

11. The system of claim 1, wherein the first input device includes a plurality of first input devices, each of which is located for each seat in the vehicle, and wherein the processor selects any one of the plurality of first input devices and supports to enter the personal information.

12. The system of claim 11, wherein the processor recognizes the first user by a face recognition device and supports to enter the personal information via the first input device matched to a location of the first user.

13. A user interface method, the method, performed by a processor in a vehicle, comprising:

determining whether to support a personal display for a first user among one or more users, when receiving a request to enter personal information of the first user in the vehicle, wherein the one or more users include the first user and one or more second users;

determining whether to support a personal input for the first user; and supporting to enter the personal information using an input device and a display device depending on whether to support the personal display and whether to support the personal input, determining whether the first display device supports an augmented reality (AR) function, wherein each seat in the vehicle includes the input device and the display device, wherein the input device includes at least one of a first input device or a second input device, and the display device includes at least one of a first display device or a second display device, wherein the supporting to enter the personal information includes:

when the input device includes the second input device and the display device includes the second display device and the first display device and when the first display device supports the AR function, mapping a display region of the first display device and an input region of the second input device; and determining information of a point, which is mapped to an input location outputted from the second input device, on the display region of the first display device as input data, and receiving the determined input data as the personal information to the first display device, wherein the second input device and the second display device are located within lines of sight of the first user and the one or more second users in respective seats in the vehicle, and wherein the first display device is located within a line of sight of the first user and is out of a line of sight of the one or more second users.

14. The method of claim 13, wherein the determining whether to support a personal input for the first user includes determining whether there is a first input device which is configured to receive an input only from the first user, other than a second input device which is configured to receive an input from at least one of the first user or the one or more second users, in the vehicle.

15. The method of claim 14, wherein the determining whether to support a personal input for the first user further includes when the supporting the personal display using the first display device is not possible, determining whether supporting the personal display using the second display device is possible.

16. The method of claim 15, wherein the determining whether it is possible to support a personal display using the second display device includes, when the supporting the personal display using the second display device is possible, receiving the personal information via the input device and displaying the received personal information on the second display device.

17. The method of claim 15, further comprising:
when the supporting the personal display using the second display device is not possible, determining whether performing line-of-sight tracking of the one or more second users in the vehicle is possible; and
when performing the line-of-sight tracking of the one or more second users is possible, determining whether the one or more second users look at the second display device through the line-of-sight tracking.

18. The method of claim 17, further comprising, when the one or more second users look at the second display device, outputting a warning about a risk of the personal information being exposed.

19. The method of claim 17, further comprising, when the one or more second users do not look at the second display device, receiving the personal information via the input device and displaying the received personal information on the second display device.

20. The method of claim 17, further comprising:
when the performing the line-of-sight tracking of the one or more second users is not possible, determining whether recognizing the one or more second users is possible; and
when the recognizing the one or more second users is not possible, outputting a warning about a risk of the personal information being exposed.

21. The method of claim 20, wherein the determining whether recognizing the one or more second users is possible includes:
when the recognizing the one or more second users is possible, detecting the one or more second users in the vehicle through the passenger recognition device;
upon detecting the one or more second users, outputting a warning about a risk of the personal information being exposed; and
receiving the personal information via the input device and displaying the received personal information on the second display device, when the one or more second users is not detected.

22. The method of claim 14, wherein the determining whether to support a personal display for a first user includes:
configuring an input screen by mapping the display region of the first display device and the input region of the second input device;
displaying the input screen on the first display device;
determining, by the first display device, whether AR function is being used;
displaying a pointer trajectory according to manipulation of the second input device on the first display device, when the AR function is used;
generating the personal information using information of the first display device, the information being mapped to the input location of the second input device; and
receiving the generated personal information and displaying the received personal information on the first display device.

23. The method of claim 14, further comprising:
after determining whether to support the personal input, when there is no first display device in the vehicle, determining whether to support a line-of-sight tracking function;
when the line-of-sight tracking function is supported, determining whether the one or more second users look at the second display device; and
when the one or more second users look at the second display device, outputting a warning about a risk that the personal information will be exposed.

24. The method of claim 23, further comprising, when the one or more second users do not look at the display device, receiving the personal information via the second input device and displaying the received personal information on the second display device.

25. The method of claim 23, further comprising:
after determining whether to support the line-of-sight tracking function, when the line-of-sight tracking function is not supported, determining whether to support a passenger recognition function;
when the passenger recognition function is supported, detecting the one or more second users in the vehicle using the passenger recognition function; and
when the one or more second users are not detected in the vehicle, displaying personal information input via the second input device on the second display device.

26. The method of claim 25, further comprising, upon determining at least one of that the when passenger recognition function is not supported or that one or more second users are detected, outputting a warning about a risk of the personal information exposed.

* * * * *